(12) United States Patent
Asano et al.

(10) Patent No.: US 9,339,955 B2
(45) Date of Patent: May 17, 2016

(54) VEHICULAR MAT AND METHOD OF MOLDING VEHICULAR MAT

(71) Applicant: TOYOTA BOSHOKU KABUSHIKI KAISHA, Aichi-ken (JP)

(72) Inventors: Mitsuaki Asano, Oogaki (JP); Mitsutaka Sakoh, Nagakute (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/722,899

(22) Filed: May 27, 2015

(65) Prior Publication Data

US 2015/0344078 A1    Dec. 3, 2015

(30) Foreign Application Priority Data

Jun. 2, 2014    (JP) .................................. 2014-114112

(51) Int. Cl.
| | |
|---|---|
| *B60N 3/04* | (2006.01) |
| *B29C 43/32* | (2006.01) |
| *B29C 43/20* | (2006.01) |
| *B29C 43/18* | (2006.01) |
| *B29K 23/00* | (2006.01) |
| *B29L 31/30* | (2006.01) |

(52) U.S. Cl.
CPC .............. *B29C 43/32* (2013.01); *B29C 43/184* (2013.01); *B29C 43/203* (2013.01); *B60N 3/042* (2013.01); *B29K 2023/16* (2013.01); *B29K 2713/00* (2013.01); *B29L 2031/3017* (2013.01)

(58) Field of Classification Search
CPC .... B29C 43/32; B29C 43/184; B29C 43/203; B60N 3/042; B29L 2031/3017; B29K 2023/16; B29K 2713/00
USPC ........................................ 296/97.23; 264/154
See application file for complete search history.

(56) References Cited

U.S. PATENT DOCUMENTS

| | | | | |
|---|---|---|---|---|
| 4,479,992 | A * | 10/1984 | Haeseker ............. | B29D 24/007 181/288 |
| 5,439,725 | A * | 8/1995 | Roberts .................. | B60N 3/044 296/97.23 |
| 5,765,900 | A * | 6/1998 | Hills ...................... | B60N 3/042 296/97.23 |

FOREIGN PATENT DOCUMENTS

JP        2006-044593 A        2/2006

* cited by examiner

*Primary Examiner* — Pinel Romain
(74) *Attorney, Agent, or Firm* — Greenblum & Bernstein, P.L.C.

(57) ABSTRACT

A vehicular mat to be placed on a vehicular floor panel includes a floor portion, a tunnel portion, a rear edge portion, at least two score lines extending in a vehicular width direction, and a tunnel cutoff portion. The floor portion commonly covers at least two types of vehicular floor panels having different lengths. The rear edge portion is continuous from a vehicular rear edge of the floor portion and has a through hole to be fitted to the opening of the tunnel portion. The vehicular mat is folded along one of the at least two score lines so that the rear edge portion is angled and lifted upward with respect to the floor portion. The tunnel cutoff portion included in the tunnel portion is to be cut off from the vehicular mat to be placed on the second vehicular floor panel.

11 Claims, 18 Drawing Sheets

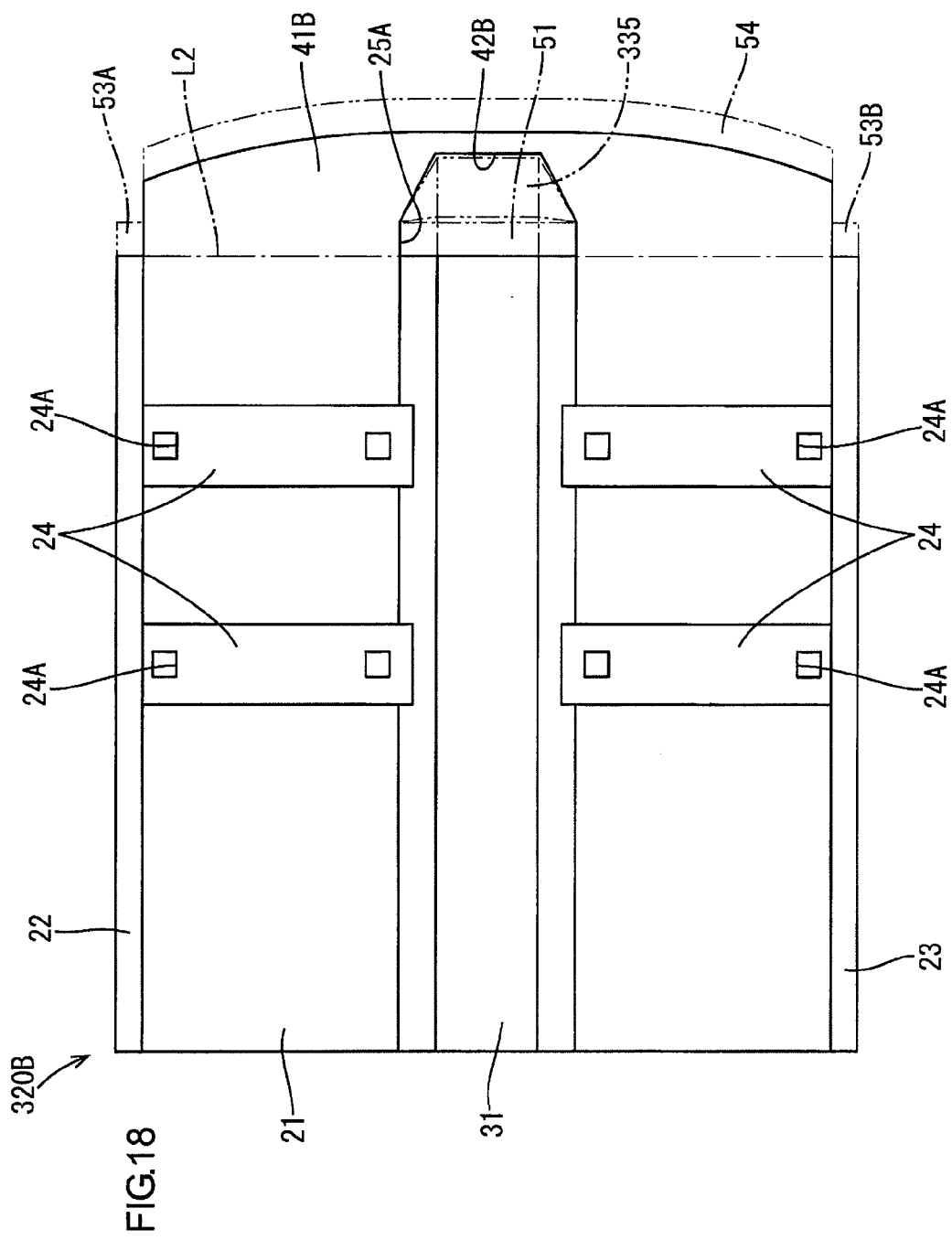

VEHICULAR MAT AND METHOD OF MOLDING VEHICULAR MAT

CROSS REFERENCE TO RELATED APPLICATION

This application claims priority from Japanese Patent Application No. 2014-114112 filed Jun. 2, 2014. The entire contents of the priority application are incorporated herein by reference.

FIELD OF THE INVENTION

The present disclosure relates to a vehicular mat and a method of molding the vehicular mat.

BACKGROUND OF THE INVENTION

A vehicular mat placed on a floor panel of a vehicle has been known. A carpet as the vehicular mat is selectively folded at corner portions thereof to be fitted on the two kinds of rear floors having different corner shapes. Accordingly, the carpet is commonly used for the two kinds of rear floors having different corner shapes and this reduces a manufacturing cost.

SUMMARY OF THE PRESENT INVENTION

The present invention was made in view of the above circumstances. An object is to provide a vehicular mat that is commonly placed on floor panels having different length in a vehicular front-rear direction and to provide a method of molding the vehicular mat.

A vehicular mat to be placed on a vehicular floor panel including a floor tunnel portion that extends in a front-rear direction of a vehicle and has a projected shape projected upward includes a floor portion, a tunnel portion, a rear edge portion, at least two score lines, and a tunnel cutoff portion. The floor portion is configured to commonly cover at least two types of vehicular floor panels including a first vehicular floor panel and a second vehicular floor panel each having a different length in a vehicular front-rear direction. The tunnel portion extends in the vehicular front-rear direction and projects upwardly to follow the floor tunnel portion, and the tunnel portion is in a middle portion of the floor portion with respect to a vehicular width direction and has an opening at a vehicular rear end thereof. The rear edge portion is continuous from a vehicular rear edge of the floor portion and has a through hole having a shape following that of the opening of the tunnel portion. The at least two score lines include a first score line and a second score line on the floor portion and extend in the vehicular width direction. The vehicular mat is folded along one of the at least two score lines so that the rear edge portion is angled and lifted upward with respect to the floor portion. The tunnel cutoff portion included in the tunnel portion ranges from the second score line to the vehicular rear end of the tunnel portion, and the tunnel cutoff portion is to be cut off from the vehicular mat to be placed on the second vehicular floor panel. The floor portion has a first length in the vehicular front-rear direction that is from a vehicular front edge of the floor portion to the first score line and the first length matches a length of the first vehicular floor panel, and the floor portion has a second length in the vehicular front-rear direction that is from the vehicular front edge of the floor portion to the second score line and the second length matches a length of the second vehicular floor panel. The through hole is to be fitted to the opening from a vehicular rear side when the vehicular mat is folded along one of the at least two score lines and the rear edge portion is angled with respect to the floor portion.

BRIEF DESCRIPTION OF THE DRAWINGS

FIG. 18 is a plan view of a second vehicular mat 320B without having a tunnel cutoff portion, side wall cutoff portions, a rear edge cutoff portion, and the sloped wall portion.

DETAILED DESCRIPTION OF EMBODIMENTS

A vehicular front-rear length of a floor panel varies depending on types of vehicles. However, it is desired to mount one kind of vehicular mat commonly on several types of vehicles, since it is easy to manufacture and control the vehicular mats. The floor panel generally includes a floor tunnel that projects upward. It is desired to provide vehicular mats that are shaped to follow the floor tunnel and are commonly used for several types of floor panels having different lengths in vehicular front-rear direction.

An embodiment will be described with reference to FIGS. 1 to 12. A vehicular mat 20 is made of flexible material. The vehicular mat 20 is formed of a felt having sound absorbing properties and ethylene-propylene-diene rubber (EPDM) having sound blocking properties. The felt and EPDM are overlapped with each other and molded into a certain shape with a press die. Such a vehicular mat 20 may be used as a floor silencer.

The vehicular mat 20 is placed on the floor panel of a vehicle. The vehicular mat 20 (a common vehicular mat) of this embodiment is commonly used for vehicular floor panels having different vehicular front-rear lengths. In the following description, the vehicular floor panels include two types of vehicular floor panels having different lengths in the vehicular front-rear direction. One of the vehicular floor panels that is relatively long in the vehicular front-rear direction is a large floor panel 10A (a first floor panel, see FIGS. 6 and 12), and another one of the vehicular floor panels that is relatively small in the vehicular front-rear direction is a small floor panel 10B (a second floor panel, see FIGS. 10 and 12).

Figure 12:
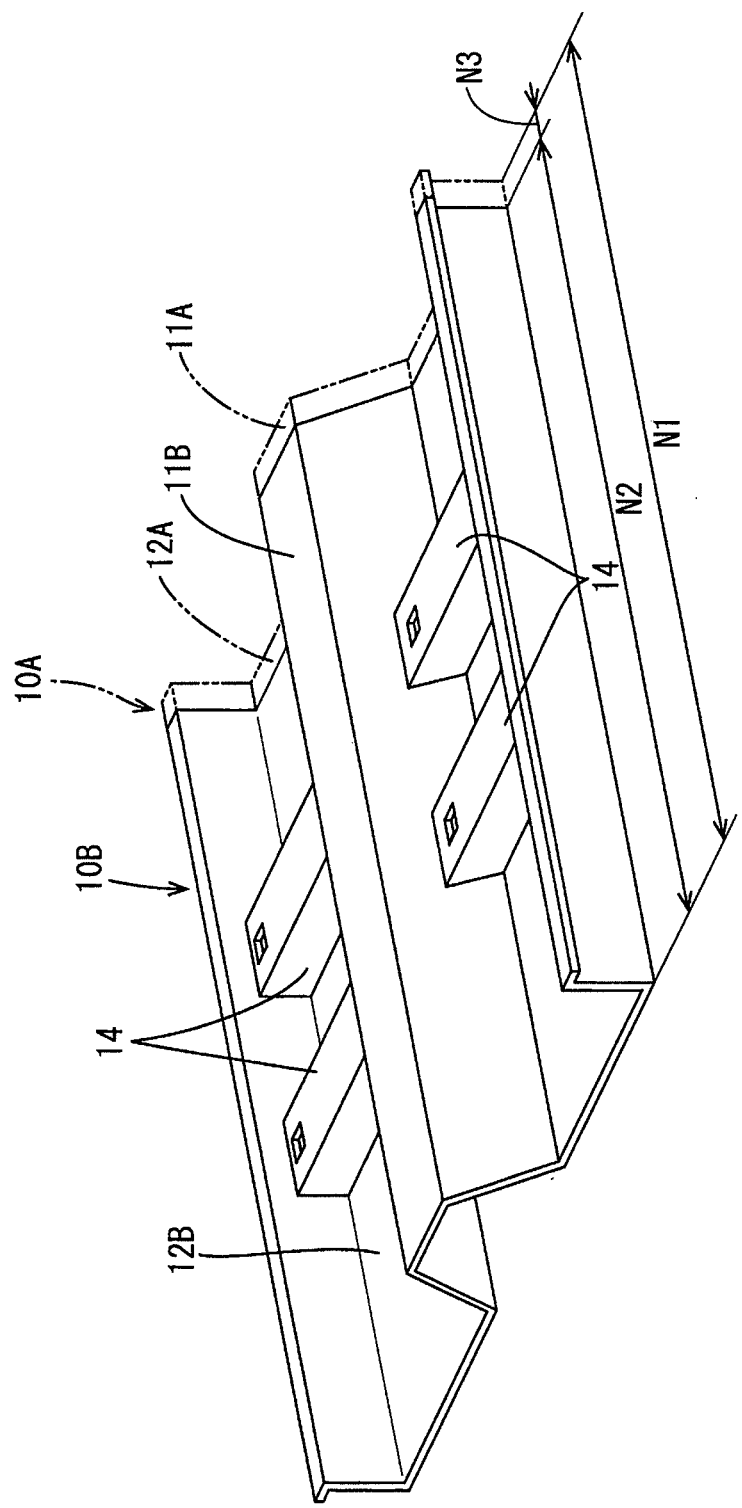
FIG. 12 is a perspective view illustrating a large floor panel 10A and a small floor panel 10B.

In FIG. 12, the small floor panel 10B is illustrated with a solid line and the large floor panel 10A is partially illustrated with a two-dot chain line. The vehicular front-rear length of a vehicular floor panel generally depends on wheelbase, however, it is not limited thereto.

In this embodiment, a part of the vehicular mat 20 is cut off so that the vehicular mat 20 is molded to correspond to one of the large floor panel 10A and the small floor panel 10B (details will be described later). The vehicular mat 20 is molded to have a shape that is fitted to and placed on the large floor panel 10A and the molded one is a first vehicular mat 20A (see FIG. 4), and the vehicular mat 20 is molded to have a shape that is fitted to and placed on the small floor panel 10B and the molded one is a second vehicular mat 20B (see FIG. 9).

The large floor panel 10A and the small floor panel 10B may be made of metal and have a rectangular plan view shape elongated in the vehicular front-rear direction. The large floor panel 10A includes a floor tunnel 11A in a middle portion on a floor surface thereof with respect to a vehicular width dimension. The floor tunnel 11A extends in the vehicular front-rear direction. The small floor panel 10B includes a floor tunnel 11B in a middle portion on a floor surface thereof with respect to the vehicular width dimension. The floor tunnels 11A, 11B project upward from the floor surfaces of the respective floor panels.

The large floor panel 10A and the small floor panel 10B differ from each other only in the vehicular front-rear length and other configurations are same. The floor tunnel 11A is longer than the floor tunnel 11B and the floor tunnels 11A, 11B have a projected cross-sectional shape (like a cross-sectional U-shape). In FIG. 12, the vehicular front-rear length of the large floor panel 10A is represented by N1 and the vehicular front-rear length of the small floor panel 10B is represented by N2. Difference between the vehicular front-rear lengths of the large floor panel 10A and the small floor panel 10B is represented by N3.

Figure 1:
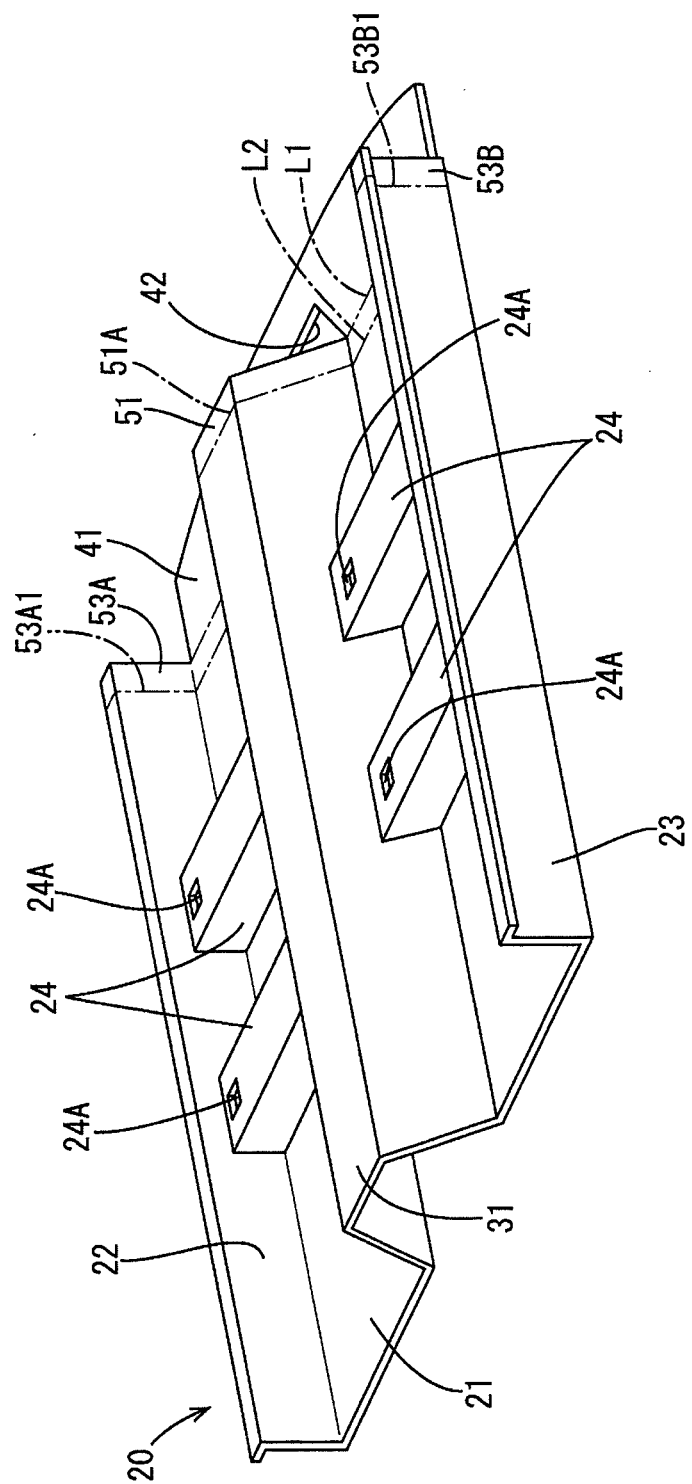
FIG. 1 is a perspective view of a vehicular mat 20 according to a first embodiment of the technology.

As illustrated in FIG. 1, the vehicular mat 20 includes a floor portion 21 having a rectangular plan view shape, a tunnel portion 31 in a middle of a vehicular width dimension of the floor portion 21, and an edge portion 41 (a vehicular rear edge portion of the vehicular mat) continuously formed from a vehicular rear edge of the floor portion 21. The vehicular mat 20 further includes side wall portions 22, 23 extending upward from the vehicular width edges of the floor portion 21, respectively.

Figure 6:
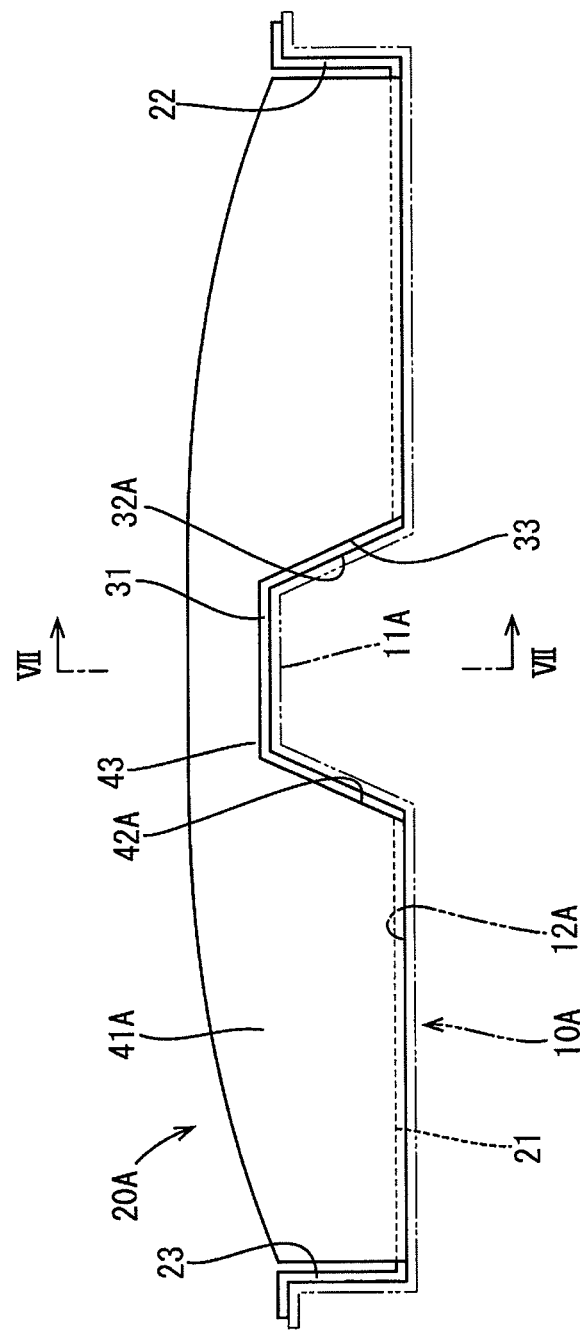
FIG. 6 is a rear view of the first vehicular mat 20A.
Figure 10:
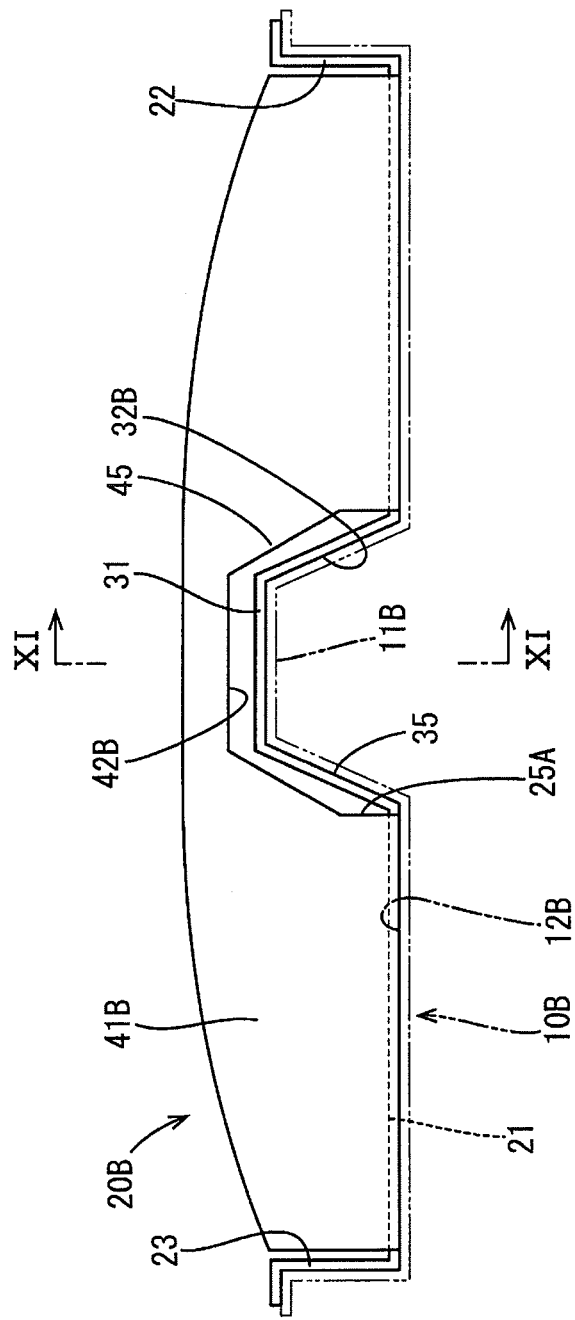
FIG. 10 is a rear view of the second vehicular mat 20B

The floor portion 21 is shaped to follow each of a shape of a floor surface 12A of the large floor panel 10A and a shape of a floor surface 12B of the small floor panel 10B and commonly covers the floor surfaces 12A, 12B (see FIGS. 6 and 10).

The floor portion 21 includes projected portions 24. Each of the projected portions 24 is hollow and has a longitudinal shape elongated in the vehicular width direction and corresponding to each reinforcing member 14 of the floor panels 10A, 10B (see FIG. 12). The projected portions 24 have through holes 24A, respectively, through which a part of a sliding seat rail is inserted.

The tunnel portion 31 is shaped to commonly cover the floor tunnel 11A and the floor tunnel 11B (see FIGS. 6 and 10). As illustrated in FIG. 1, the tunnel portion 31 is formed such that a middle portion of the floor portion 21 with respect to a vehicular width dimension is projected upward. The tunnel portion 31 is formed to follow the shapes of the floor tunnel 11A and the floor tunnel 11B. The tunnel portion 31 opens downward and has a shape so as to receive or fit each of the floor tunnel 11A and the floor tunnel 11B. The tunnel portion 31 has an opening width (in the vehicular width direction) greater than a width (in the vehicular width direction) of an upper surface thereof. Opposing side walls of the tunnel portion 31 are farther away from each other as they extend closer to the opening of the tunnel portion 31.

The tunnel portion 31 extends in the vehicular front-rear direction and opens at a vehicular front end and a vehicular rear end. The vehicular rear end of the tunnel portion 31 has an opening 32A that opens to the vehicular rear side and has an opening edge 33 around the opening 32A. As illustrated in FIG. 6, the opening edge 33 has a trapezoidal shape with a lower side open seen from the vehicular rear side.

Figure 2:
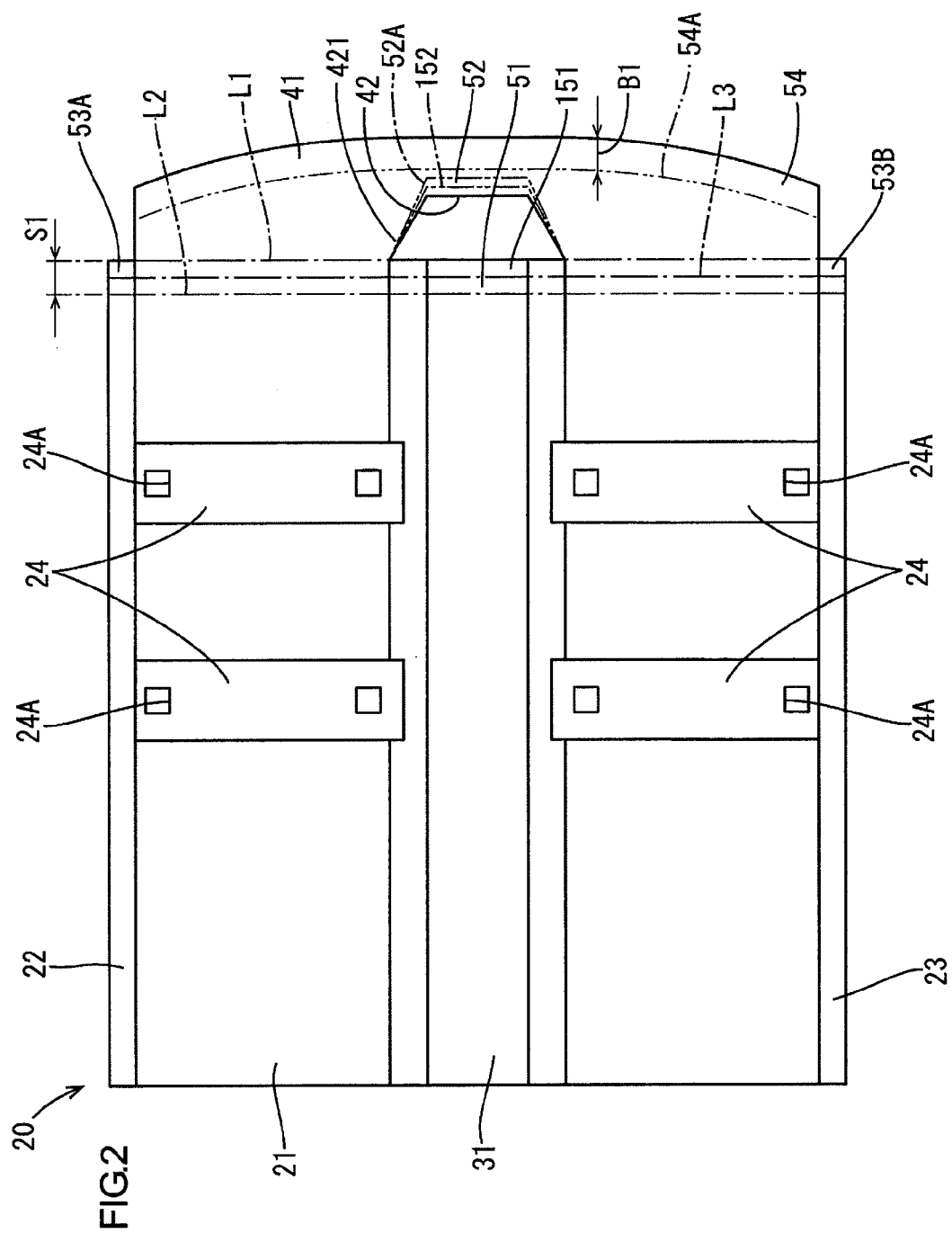
FIG. 2 is a plan view of the vehicular mat 20 of FIG. 1.

As illustrated in FIGS. 1 and 2, the edge portion 41 is elongated in the vehicular width direction. The edge portion 41 has a vehicular rear edge that is curved. The floor portion 21 and the edge portion 41 are continuously and integrally formed as a unitary part such that the vehicular mat 20 is folded so that the edge portion 41 is angled with respect to the floor portion 21.

Figure 4:
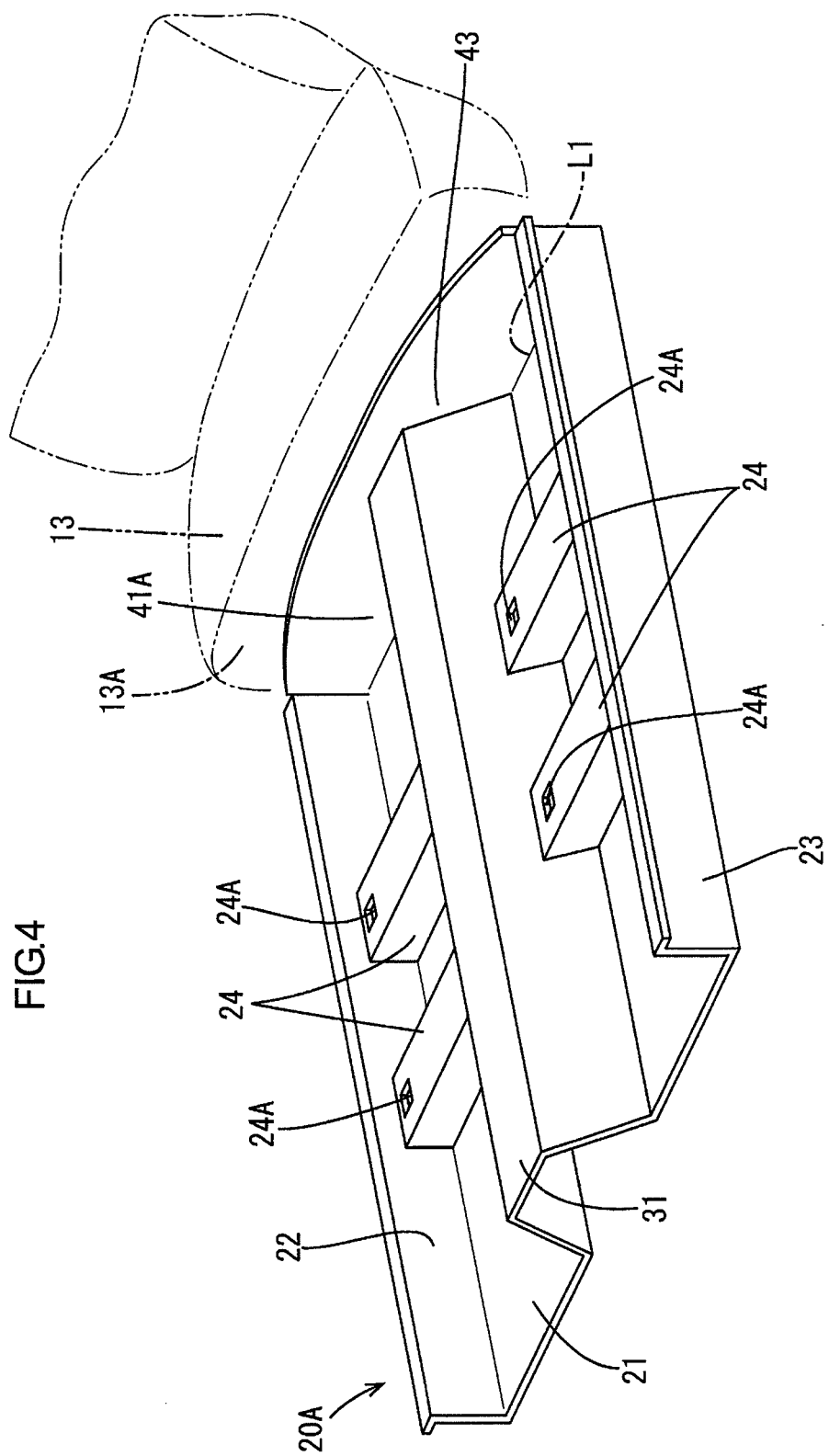
FIG. 4 is a perspective view of the first vehicular mat 20A seen from a vehicular front side.

According to such a configuration, as illustrated in FIGS. 4 and 6, the first vehicular mat 20A that is to be placed on the large floor panel 10A has a first edge portion 41A without a through hole cutoff portion 52, which will be described later. The first edge portion 41A is angled at the vehicular rear edge of the floor portion 21 with respect to the floor portion 21. Accordingly, the first vehicular mat 20A that is placed on the large floor panel 10A has the first edge portion 41A as a first wall portion (a wall portion) that follows a front surface 13A of a seat 13. In this embodiment, the first edge portion 41A is perpendicular to the floor portion 21 when the first vehicular mat 20A is placed on the large floor panel 10A.

Figure 3:
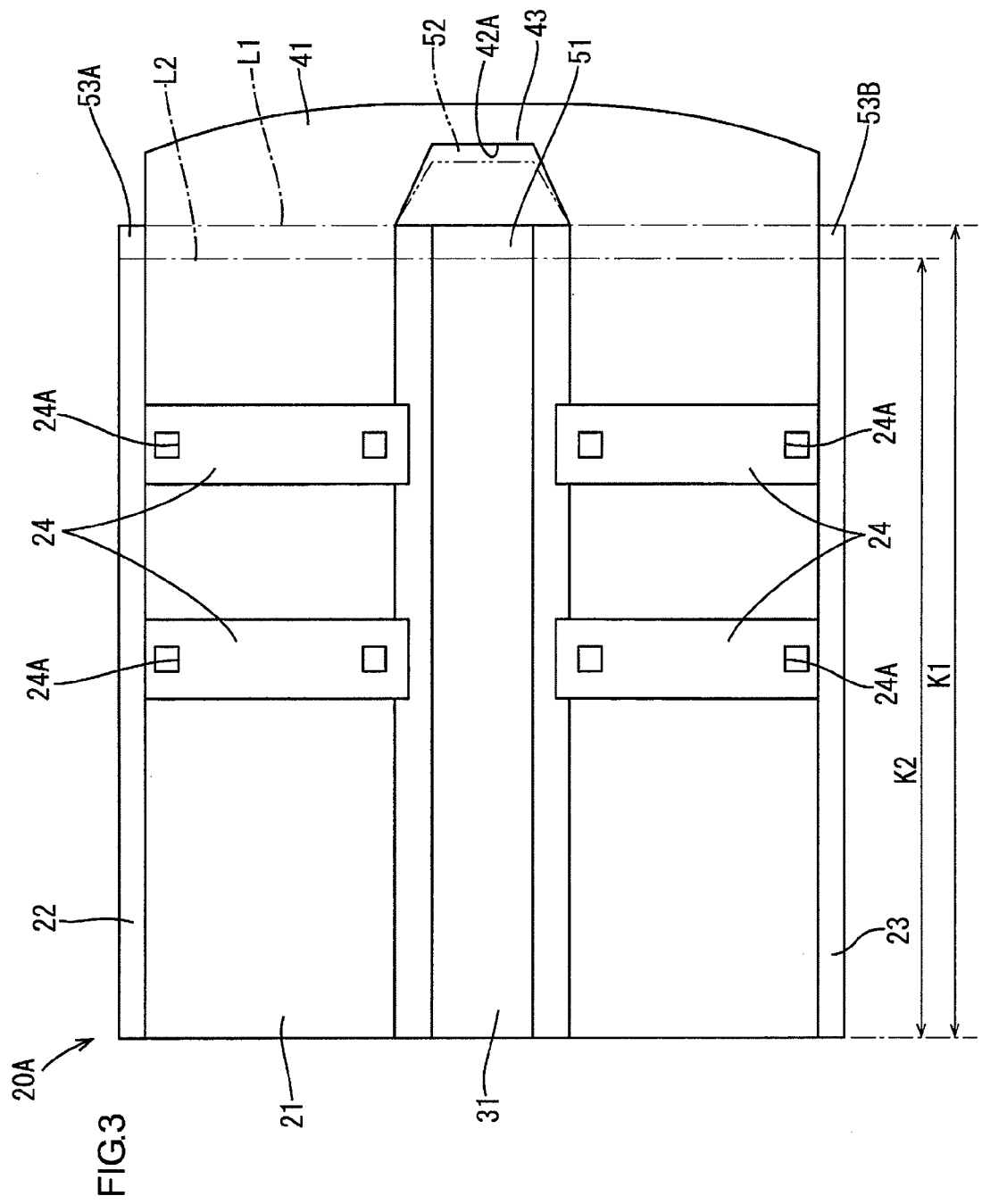
FIG. 3 is a plan view of a first vehicular mat 20A without having a through hole cutoff portion.

As illustrated in FIGS. 1 to 3, a first score line L1 and a second score line L2 are on the floor portion 21 of the vehicular mat 20 and extend in the vehicular width direction. The vehicular mat 20 is folded along one of the first score line L1 and the second score line L2 so that the edge portion 41 is angled with respect to the floor portion 21. The vehicular mat 20 is folded along the first score line L1 to obtain the first vehicular mat 20A for the large floor panel 10A, and the vehicular mat 20 is folded along the second score line L2 to obtain the second vehicular mat 20B for the small floor panel 10B. In this embodiment, the vehicular mat 20 is folded along one of the first score line L1 and the second score line L2 according to one of the vehicular floor panels where the vehicular mat 20 is to be placed, and the edge portion 41 is angled with respect to the floor portion 21.

The first score line L1 may include slits arranged in the vehicular width direction on the floor portion 21 so that the edge portion 41 is more easily angled with respect to the floor portion 21. The first score line L1 may include a groove extending in the vehicular width direction so that the vehicular mat 20 partially has a thin portion and the edge portion 41 is more easily angled with respect to the floor portion 21. The vehicular mat 20 having high flexibility does not necessarily include any configuration that makes the edge portion 41 to be angled easily such as the slits or the groove. In the plan view in FIG. 2, the first score line L1 is on the vehicular rear end of the tunnel portion 31. Namely, the opening 32A is on the first score line L1.

As illustrated in FIG. 2, the edge portion 41 has a through hole 42 corresponding to the tunnel portion 31. The edge portion 41 has a hole edge 421 around the through hole 42 having a trapezoidal shape with a lower side open corresponding to the opening edge 33.

The second score line L2 is in front of the first score line L1 on the floor portion 21. The second score line L2 extends in the vehicular width direction. The vehicular mat 20 is folded along the second score line L2 to obtain the second vehicular mat 20B for the small floor panel 10B. Specifically, the vehicular mat 20 is folded along the second score line L2 so that a portion of the floor portion 21 (a rear portion 21A of the floor portion 21 and the edge portion 41) that is on a vehicular rear side with respect to the second score line L2 is angled with respect to the floor portion 21 to obtain the second vehicular mat 20B for the small floor panel 10B. Details will be described below.

The second score line L2 may include slits arranged in the vehicular width direction on the floor portion 21 of the vehicular mat 20 so that the edge portion 41 is more easily angled with respect to the floor portion 21. The second score line L2 may include a groove extending in the vehicular width direction so that the vehicular mat 20 partially has a thin portion and the edge portion 41 is more easily angled with respect to the floor portion 21. The vehicular mat 20 having high flexibility does not necessarily include any configuration that makes the edge portion 41 to be angled easily such as the slits or the groove.

As illustrated in FIG. 2, the first score line L1 and the second score line L2 extend in the vehicle width direction. A distance S1 between the first score line L1 and the second score line L2 in the vehicular front-rear direction is equal to difference N3 (see FIG. 12) between the lengths of the large floor panel 10A and the small floor panel 10B in the vehicular front-rear direction.

With respect to the vehicular front-rear direction, a length K2 between the vehicular front edge of the floor portion 21 and the second score line L2 (see FIG. 3) is equal to a length N2 of the small floor panel 10B (see FIG. 12). With respect to the vehicular front-rear direction, a length K1 between the vehicular front edge of the floor portion 21 and the first score line L1 is equal to a length N1 of the large floor panel 10A.

The tunnel portion 31 includes the tunnel cutoff portion 51 that is a portion thereof ranging from the second score line L2 to the vehicular rear end of the tunnel portion 31. The tunnel cutoff portion 51 is a portion of the tunnel portion 31 located on the vehicular rear side with respect to the second score line L2. The tunnel cutoff portion 51 is defined by a tunnel cutoff line 51A and the end of the tunnel portion 31 and is cut off along the tunnel cutoff line 51A when the vehicular mat 20 is molded into the second vehicular mat 20B for the small floor panel 10B. The edge portion 41 includes the through hole cutoff portion 52 at the hole edge 421 around the through hole 42. The through hole cutoff portion 52 is defined by a through hole cutoff line 52A (see FIG. 2) and the hole edge 421, and the through hole cutoff portion 52 is cut off along the through hole cutoff line 52A and a second through hole 42B is obtained when the vehicular mat 20 is molded into the first vehicular mat 20A for the large floor panel 10A. The through hole cutoff portion 52 has a predetermined area from the hole edge 421.

An opening size of the through hole 42 is smaller than that of the opening 32A. After the through hole cutoff portion 52 is cut off, a first through hole 42A having a greater opening size than that of the opening 32A is formed in the first edge portion 41A, as illustrated in FIG. 6. A hole edge 43 around the first through hole 42A has a shape following that of the opening edge 33 around the opening 32A and the hole edge 43 and the opening edge 33 have a trapezoidal shape with a lower side open.

Figure 5:
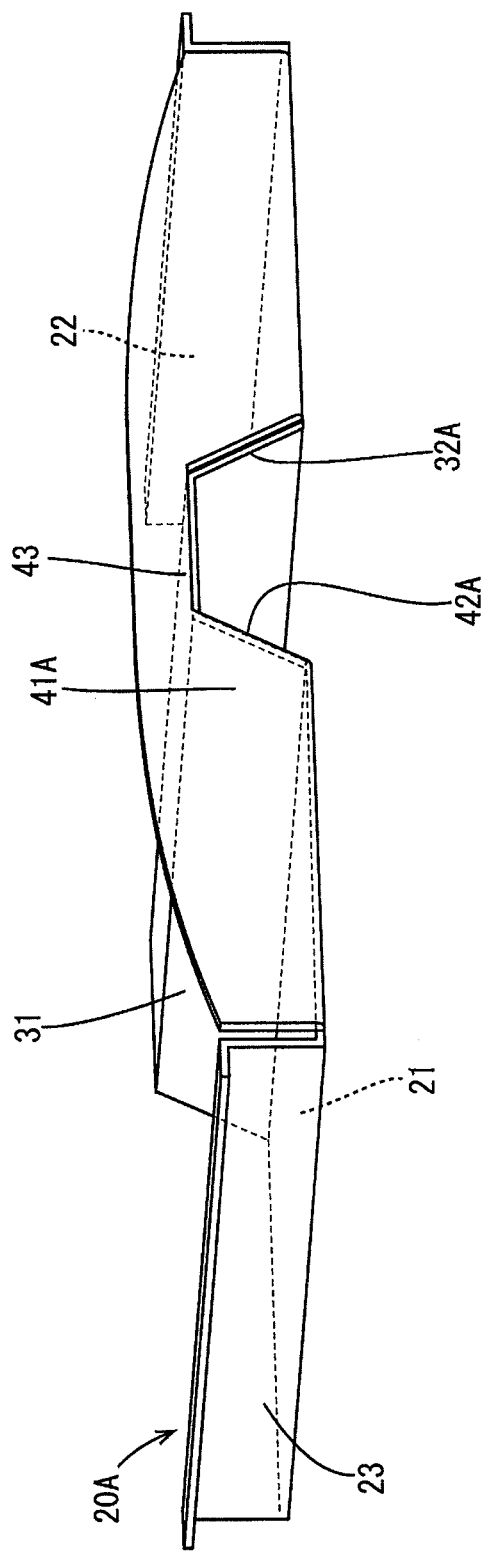
FIG. 5 is a perspective view of the first vehicular mat 20A seen from a vehicular rear side.

As illustrated in FIGS. 5 and 6, the first vehicular mat 20A is placed on the large floor panel 10A so that the first through hole 42A corresponds to the opening 32A of the tunnel portion 31 from the vehicular rear side and the first through hole 42A is communicated with the opening 32A. Namely, the first through hole 42A overlaps the opening 32A seen from the vehicular rear side. Accordingly, the opening 32A is not covered with the first edge portion 41A and the floor tunnel 11A is less likely to be in contact with the first edge portion 41A when the first vehicular mat 20A is placed on the large floor panel 10A.

Figure 8:
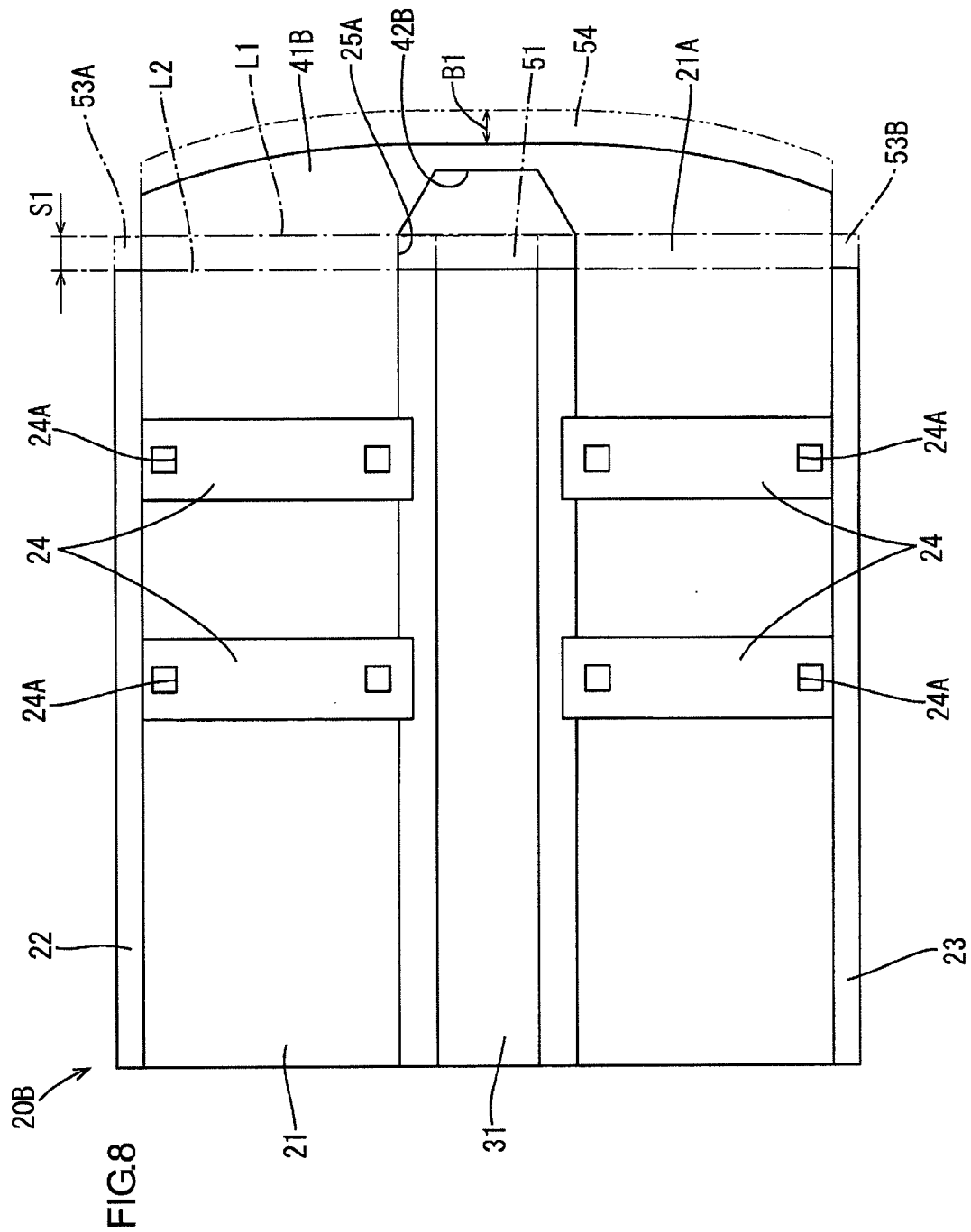
FIG. 8 is a plan view of a second vehicular mat 20B without having a tunnel cutoff portion, side wall cutoff portions, and a rear edge cutoff portion.
Figure 9:
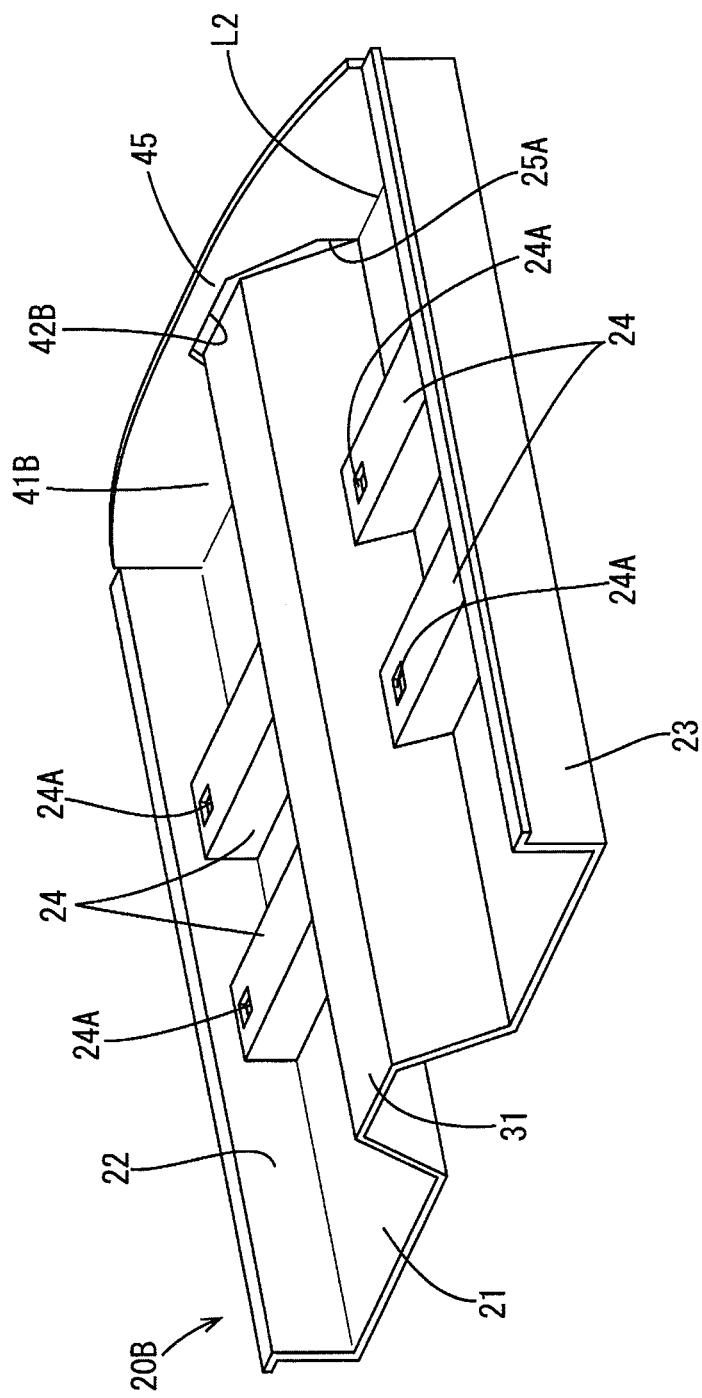
FIG. 9 is a perspective view of the second vehicular mat 20B seen from the vehicular front side.

As illustrated in FIG. 9, the second vehicular mat 20B that is placed on the small floor panel 10B is folded along the second score line L2 so that a second edge portion 41B including the rear portion 21A of the floor portion 21 is angled with respect to the floor portion 21. Specifically, the second edge portion 41B of the second vehicular mat 20B is obtained by cutting off the tunnel cutoff portion 51, side wall cutoff portions 53A, 53B and a rear edge cutoff portion 54, which will be described later, from the vehicular mat 20, and the second edge portion 41B includes the rear portion 21A of the floor portion 21, as illustrated in FIG. 8. Accordingly, the second edge portion 41B constitutes a second wall portion (the wall portion) that follows a front surface of the seat 13, as illustrated in FIG. 9. In this embodiment, the second edge portion 41B is perpendicular to the floor portion 21 when the second vehicular mat 20B is placed on the small floor panel 10B.

The tunnel cutoff portion 51 is cut off from the tunnel portion 31 along the tunnel cutoff line 51A that is on the second score line L2 when the second vehicular mat 20B is placed on the small floor panel 10B. Accordingly, a cut edge of the tunnel portion 31 is obtained along the second score line L2 as an opening 32B (the vehicular rear end of the tunnel portion 31) as illustrated in FIG. 10. The opening 32B has an opening size same as that of the opening 32A.

In the second vehicular mat 20B that is folded along the second score line L2, the second edge portion 41B is angled so that the second through hole 42B corresponds to the opening 32B and the second through hole 42B is communicated with the opening 32B. The second through hole 42B is obtained by cutting off the Namely, the second through hole 42B overlaps the opening 32B from the vehicular rear side. Accordingly, the opening 32B is less likely to be covered with the second edge portion 41B and the floor tunnel 11B is less likely to be in contact with the second edge portion 41B.

The side wall portions 22, 23 include the side wall cutoff portions 53A, 53B at rear ends thereof, respectively. The side wall cutoff portions 53A, 53B are portions on the vehicular rear side with respect to the second score line L2. The side wall cutoff portions 53A, 53B are defined by edges of the side wall portions 22, 23 and side wall cutoff lines 53A1, 53B1, respectively, as illustrated in FIG. 1. The side wall cutoff portions 53A, 53B are cut off along the side wall cutoff lines 53A1, 53B1, respectively, from the side wall portions 22, 23, when the vehicular mat 20 is molded into the second vehicular mat 20B.

The edge portion 41 of the vehicular mat 20 includes the rear edge cutoff portion 54 near a vehicular rear edge thereof. The rear edge cutoff portion 54 is defined by a rear edge of the edge portion 41 and a rear edge cutoff line 54A (see FIG. 2)

and to be cut off along the rear edge cutoff line 54A from the vehicular mat 20 to mold the vehicular mat 20 into the second vehicular mat 20B. The rear edge cutoff portion 54 has an elongated shape extending along the rear edge of the edge portion 41 and has a width B1 (a length in the vehicular front-rear direction) that is equal to the distance S1 between the first score line L1 and the second score line L2. Accordingly, when the first vehicular mat 20A is folded along the first score line L1 and the second vehicular mat 20B is folded along the second score line L2, the first edge portion 41A of the first vehicular mat 20A has a height same as that of the second edge portion 41B of the second vehicular mat 20B.

Next, a method of molding the vehicular mat 20 will be described. In this embodiment, the vehicular mat 20 is molded into the first vehicular mat 20A with executing a first vehicular mat molding process including a first cutting process and a first folding process to obtain the first vehicular mat 20A for the large floor panel 10A. The vehicular mat 20 is molded into the second vehicular mat 20B with executing a second vehicular mat molding process including a second cutting process and a second folding process to obtain the second vehicular mat 20B for the small floor panel 10B.

(First Cutting Process)

As illustrated in FIG. 3, in the first cutting process, the through hole cutoff portion 52 (illustrated with a two-dot chain line) is cut off along the through hole cutoff line 52A from the vehicular mat 20. Accordingly, the through hole 42 is deformed into the first through hole 42A and the first edge portion 41A is obtained and the first vehicular mat 20A is obtained. The through hole 42 and the first through hole 42A are formed by cutting off a part of the vehicular mat 20 with shearing action of the press die. However, the through hole 42 and the first through hole 42A may be formed in a different method. For example, the through hole 42 may be formed with a water jet cutter, and the first through hole 42A may be formed with a press die.

(First Folding Process)

In the first folding process, the first vehicular mat 20A is folded along the first score line L1 so that the first edge portion 41A (the vehicular rear edge portion) is lifted upwardly and angled with respect to the floor portion 21. Accordingly, the first edge portion 41A constitutes the first wall portion that extends upward from the vehicular rear edge of the floor portion 21. Thus, the first vehicular mat 20A is molded and folded to be fitted to the large floor panel 10A.

Figure 7:
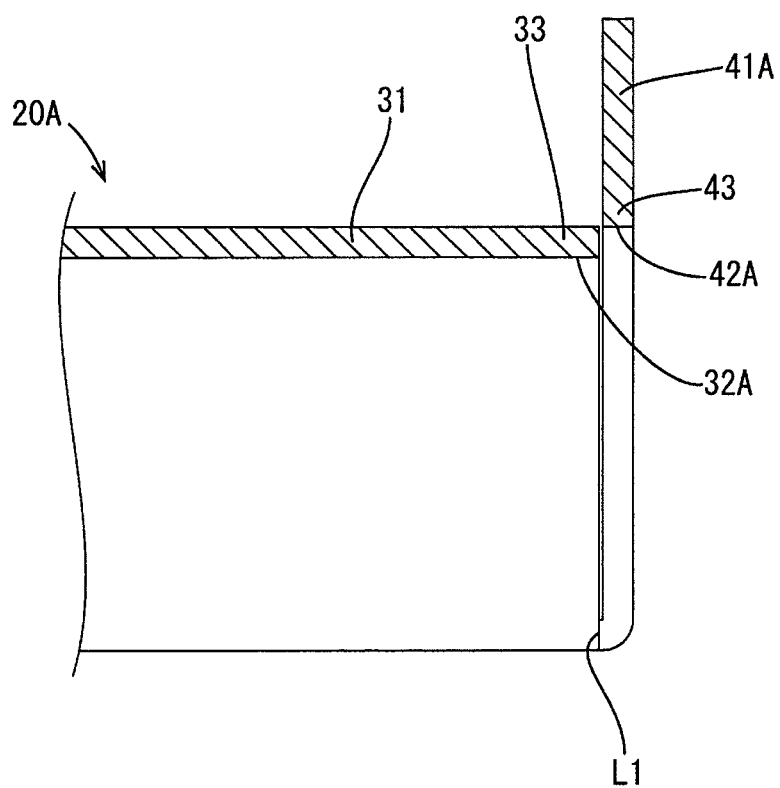
FIG. 7 is a cross-sectional view of a vehicular rear portion of the first vehicular mat 20A taken along line VII-VII in FIG. 6.

The first through hole 42A is greater than the opening 32A. In the first vehicular mat 20A, the first through hole 42A (a through hole that is fitted to the opening from the vehicular rear side) is fitted to the opening 32A of the tunnel portion 31 from the vehicular rear side, when the first vehicular mat 20A is folded along the first score line L1. Specifically, as illustrated in FIGS. 6 and 7, the opening edge 33 of the opening 32A of the tunnel portion 31 is arranged on an inner side with respect to the hole edge 43 of the first through hole 42A and the opening 32A is seen from the vehicular rear side.

(Second Cutting Process)

In the second cutting process, as illustrated in FIG. 8, the tunnel cutoff portion 51, the side wall cutoff portions 53A, 53B, and the rear edge cutoff portion 54 are cut off from the vehicular mat 20 and the second edge portion 41B is obtained and the second vehicular mat 20B is obtained. The second vehicular mat 20B can be folded along the second score line L2 by cutting off the tunnel cutoff portion 51, the side wall cutoff portions 53A, 53B, and the rear edge cutoff portion 54 from the vehicular mat 20.

The floor portion 21 has a through hole 25A at the rear edge portion thereof after the tunnel cutoff portion 51 of the tunnel portion 31 that opens downward is cut off. The through hole 25A is continuous to the through hole 42 and the through hole 25A and the through hole 42 constitute the second through hole 42B.

(Second Folding Process)

In the second folding process, the second vehicular mat 20B is folded along the second score line L2 so that the portion thereof located on the vehicular rear side with respect to the second score line L2 is angled and lifted upward with respect to the floor portion 21. The portion of the second vehicular mat 20B located on the vehicular rear side with respect to the second score line L2 corresponds to the second edge portion 41B including the rear portion 21A of the floor portion 21.

Figure 11:
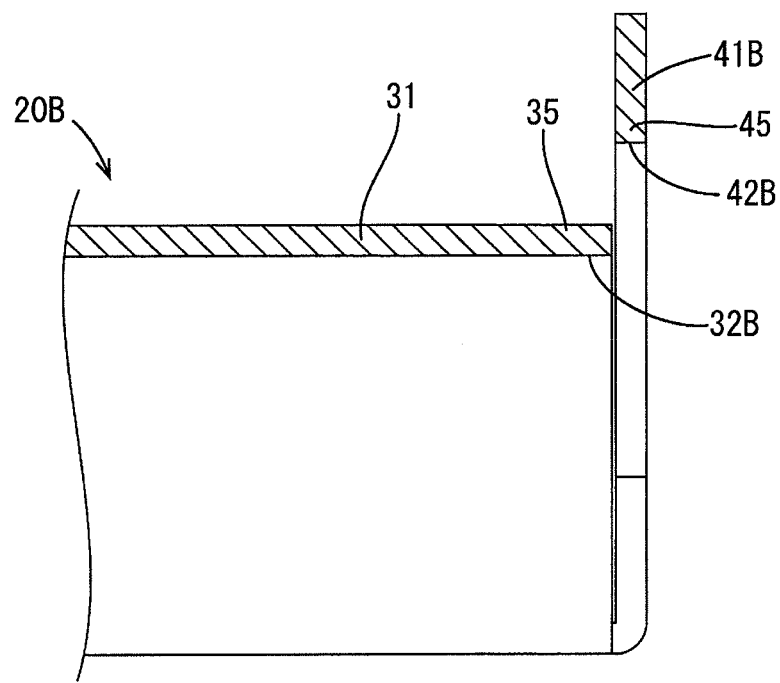
FIG. 11 is a cross-sectional view of a rear portion of the second vehicular mat 20B taken along line XI-XI in FIG. 10.

Accordingly, the second edge portion 41B including the rear portion 21A of the floor portion 21 constitutes a second wall portion. Thus, the second vehicular mat 20B is molded and folded to be fitted to the small floor panel 10B. The second through hole 42B including the through hole 42 and the through hole 25A is greater than the opening 32B. The second through hole 42B is fitted to the opening 32B of the tunnel portion 31 from the vehicular rear side. Specifically, as illustrated in FIGS. 10 and 11, the opening edge 35 of the opening 32B of the tunnel portion 31 is arranged inside an hole edge 45 of the second through hole 42B and the opening 32B is seen from the vehicular rear side.

According to this embodiment, the vehicular mat includes multiple score lines corresponding to multiple types of vehicular floor panels. The vehicular mat is folded along one of the score lines and the edge portion 41 is angled corresponding to the type of vehicular floor panel where the vehicular mat is to be placed so that the length of the floor portion 21 in the vehicular front-rear direction is adjusted to match the length of the corresponding vehicular floor panel.

Specifically, the vehicular mat 20 is folded along the first score line L1 so that the length of the floor portion 21 in the vehicular front-rear direction is adjusted to match the length of the large floor panel 10A, and the vehicular mat 20 is folded along the second score line L2 so that the length of the floor portion 21 in the vehicular front-rear direction is adjusted to match the length of the small floor panel 10B. Accordingly, the vehicular mat 20 is commonly used for the different types of floor panels having different lengths in the vehicular front-rear direction. The vehicular mat 20 is easily molded into the shapes of the first and second vehicular mats 20A, 20B for the floor panels having different lengths in the vehicular front-rear direction.

A vehicular mat may include multiple separate pieces and combination of the separate pieces may be varied to fit the vehicular mat on each of the floor panels 10A, 10B having different lengths in the vehicular front-rear direction. For example, relatively large separate pieces are used for the large floor panel 10A and relatively small separate pieces are used for the small floor panel 10B. However, in such a vehicular mat 20 including multiple separate pieces, the separate pieces may overlap each other or may be arranged with a space therebetween. Accordingly, the vehicular mat may not be flat or may not have a flush surface as a whole, and this may deteriorate a design and passengers' foot feeling of the vehicular mat.

In this embodiment, one kind of vehicular mat 20 is commonly used for the different types of floor panels 10A, 10B. The one kind of vehicular mat 20 is folded along different score lines and different cutoff portions are cut off from the one kind of vehicular mat 20 according to one of the different types of floor panels 10A, 10B having different lengths in the vehicular front-rear direction. Therefore, a design of the vehicular mat is less likely to be deteriorated and a passenger is less likely to have uncomfortable foot feeling.

In this embodiment, the vehicular mat 20 is molded into the shape to be fitted to the large floor panel 10A by carrying out the first vehicular mat molding process including the first cutting process and the first folding process, and the vehicular mat 20 is molded into the shape to be fitted to the small floor panel 10B by carrying out the second vehicular mat molding process including the second cutting process and the second folding process. Namely, the vehicular mat 20 is selectively molded into the one for the large floor panel 10A and another one for the small floor panel 10B.

In this embodiment, the through hole cutoff portion 52 is cut off from the vehicular mat 20 to obtain the first vehicular mat 20A and the through hole cutoff portion 52 is not cut off from the vehicular mat 20 to obtain the second vehicular mat 20B. Accordingly, an area of the second edge portion 41B included in the second vehicular mat 20B is less likely to be unnecessarily decreased and performances of the vehicular mat as the floor silencer (sound absorbing properties and sound blocking properties) are less likely to be deteriorated.

In the first cutting process, the hole edge of the through hole 42 that is previously formed in the vehicular rear edge portion of the vehicular mat 20 is cut off so that the first through hole 42A is formed. The first through hole 42A is easily formed in the first cutting process since the vehicular mat 20 previously includes the through hole 42.

Second Embodiment

Figure 15:
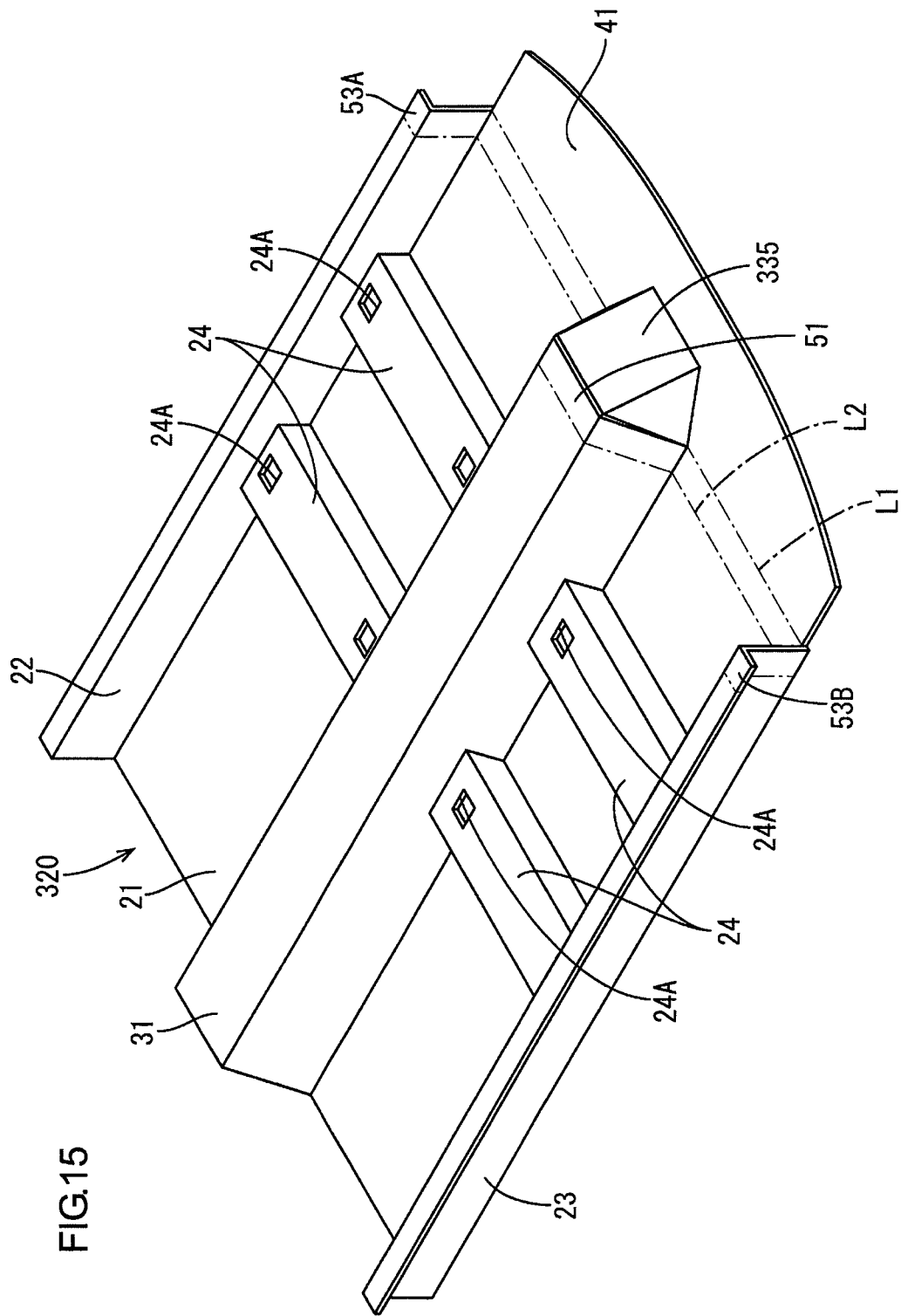
FIG. 15 is a perspective view of a vehicular mat 320 according to a second embodiment.
Figure 16:
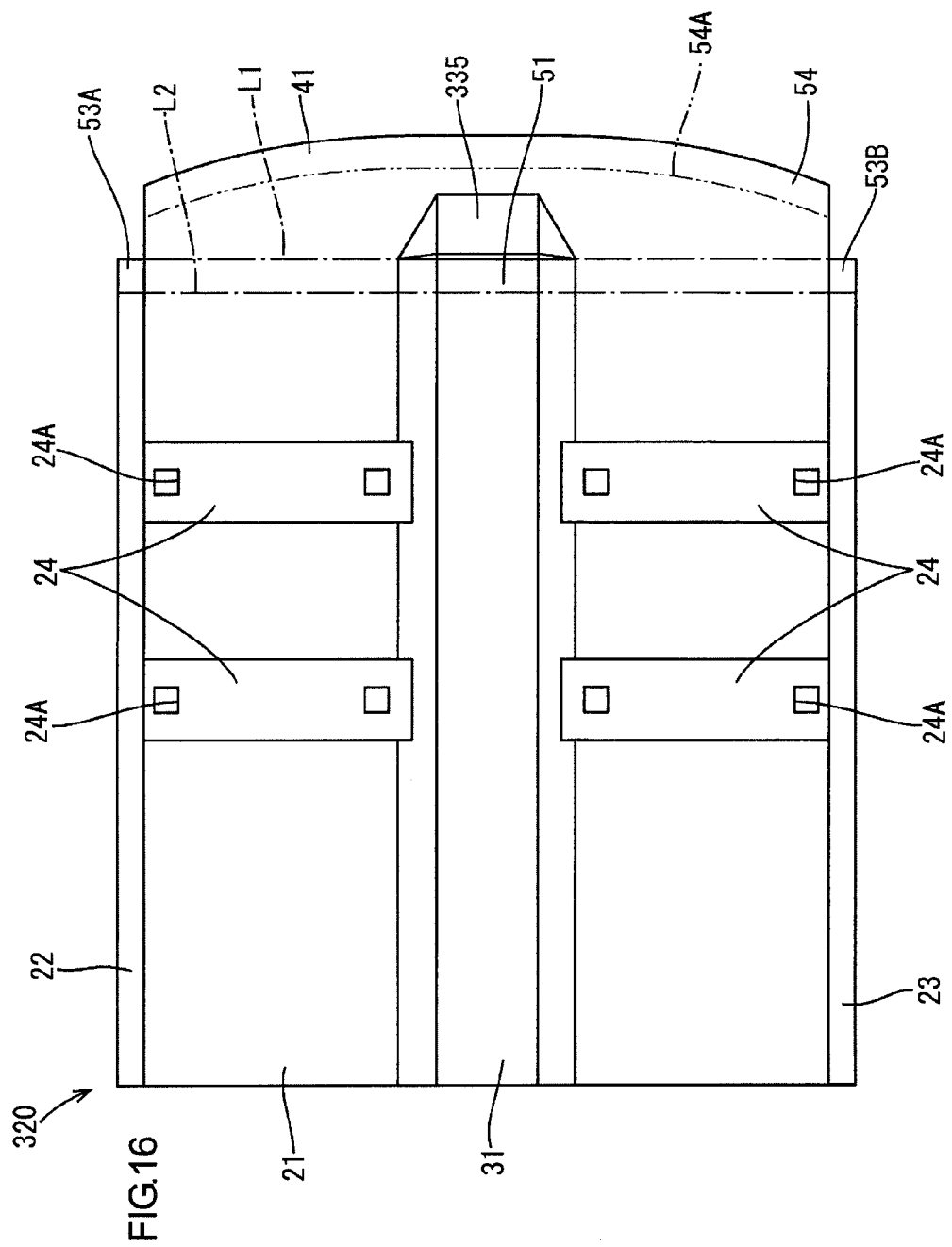
FIG. 16 is a plan view of the vehicular mat 320.

A second embodiment will be described with reference to FIGS. 15 to 18. In this embodiment, a vehicular mat 320 has a configuration different from that of the above embodiment. In this embodiment, as illustrated in FIGS. 15 and 16, the vehicular mat 320 includes a sloped wall portion 335 at the edge portion 41 thereof.

The sloped wall portion 335 extends from a rear edge of the tunnel portion 31, namely, the opening edge 33 of the opening 32A toward the vehicular rear side to be sloped downward. The lower end of the sloped wall portion 335 is connected to the edge portion 41 and the sloped wall portion 335 covers the opening 32A and the through hole 42 from the above. As illustrated in FIG. 16, the sloped wall portion 335 has a trapezoidal plan view shape. The sloped wall portion 335 is molded in the molding of the vehicular mat 320 with the press die. The vehicular mat 320 has a configuration same as that of the vehicular mat 20 of the above embodiment other than the sloped wall portion 335.

Next, a method of molding the vehicular mat 320 will be described. In this embodiment, the method of molding the vehicular mat 320 differs from the method of molding the vehicular mat 20 in the first cutting process and the second cutting process and the first folding process and the second folding process in the method of molding the vehicular mat 320 are same as those in the method of molding the vehicular mat 20. Therefore, the first and second folding processes will not be described.

(First Cutting Process)

Figure 17:
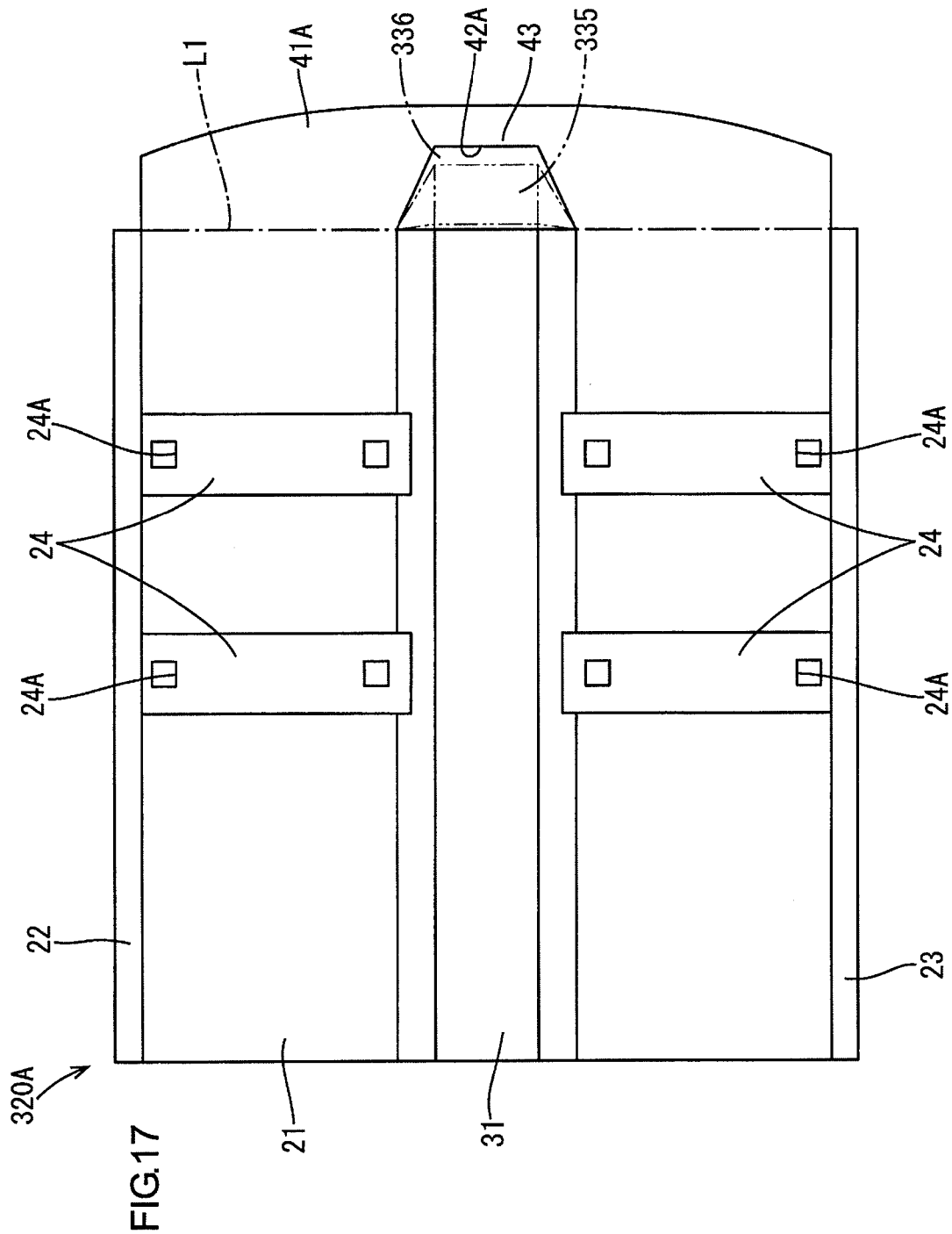
FIG. 17 is a plan view of a first vehicular mat 320A without having a sloped wall portion.

As illustrated in FIG. 17, the sloped wall portion 335 that is a part of the vehicular rear edge portion of the vehicular mat represented by a two-dot chain line and the hole edge 421 of the through hole 42, that is, a cutoff portion 336 at a peripheral portion of the sloped wall portion 335 are cut off from the vehicular mat 320 to obtain a first vehicular mat 320A for the large floor panel 10A. The cutoff portion 336 is a part of the edge portion 41 and also a part of the vehicular rear edge portion of the vehicular mat. Thus, the first through hole 42A is formed.

(Second Cutting Process)

As illustrated in FIG. 18, the sloped wall portion 335 represented by the two-dot chain line and the tunnel cutoff portion 51 are cut off from the vehicular mat 320 to obtain a second vehicular mat 320B for the small floor panel 10B. Thus, the second through hole 42B including the through hole 25A is formed.

Other Embodiments

The present technology is not limited to the description as described above with reference to the drawings. The technology described therein may include following embodiments.

(1) The functions and material of the vehicular mat 20 are not limited to the ones in the above embodiments. A carpet of a mat for increasing height may be used as the vehicular mat. The vehicular mat 20 is not limited to a two-layered configuration but may be mono-layered or three or more than three layered configurations.

Figure 13:
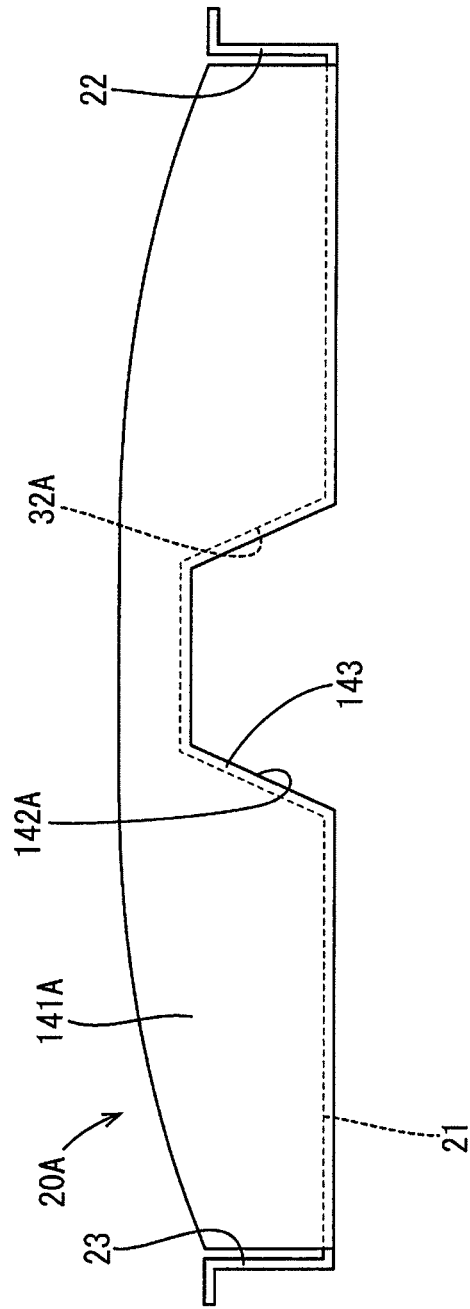
FIG. 13 is a vehicular mat according to a first modification including another first through hole in a first edge portion 141A.
Figure 14:
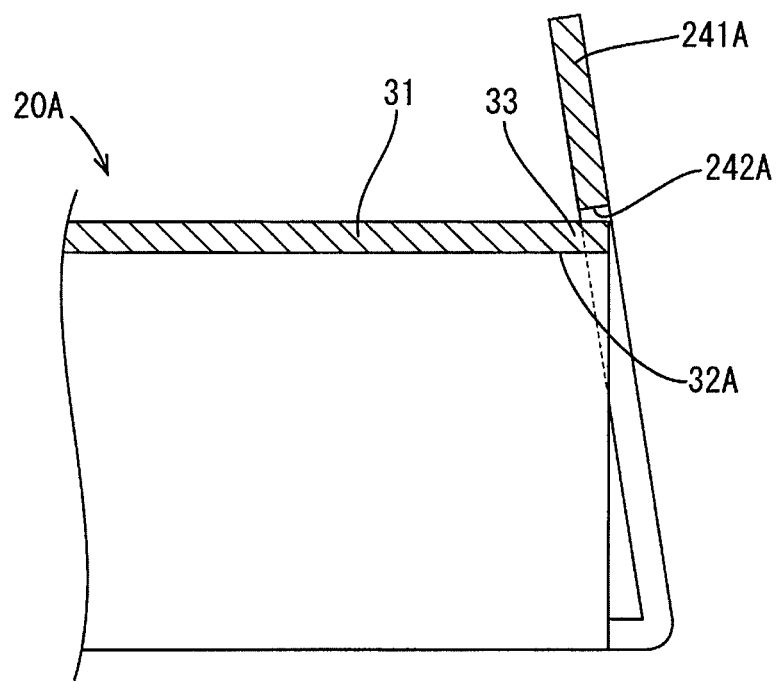
FIG. 14 is a vehicular mat according to a second modification including another different first through hole in a first edge portion 241A.

(2) The shape of the first through hole 42A in the first edge portion 41A and the shape of the second through hole 42B in the second edge portion 41B may not be the ones in the above embodiments and may be modified. The edge portion has the through hole having any shape so as not to close the opening 32A, 32B from the vehicular rear side. For example, as illustrated in FIG. 13, a first edge portion 141A may have a first through hole 142A that is smaller than the opening 32A. A hole edge 143 of the first through hole 142A protrudes from the opening edge 33 of the opening 32A to cover partially the opening 32A. As illustrated in FIG. 14, the opening edge 33 of the opening 32A of the tunnel portion 31 may be within a first through hole 242A.

(3) The vehicular mat is commonly used for the two types of vehicular floor panels in the above embodiments. However, the vehicular mat may be commonly used for three or more types of vehicular floor panels. For example, the vehicular mat may include the first score line L1, the second score line L2, and a third score line L3 illustrated in FIG. 2 or may include other cutoff portions other than the cutoff portions 51, 52, 53A, 53B, 54. The third score line L3 is between the first score line L1 and the second score line L2.

The vehicular mat 20 is folded along the third score line L3 in FIG. 2 to be molded into a third vehicular mat for a third vehicular floor panel having a length between the lengths of the large floor panel 10A and the small floor panel 10B. The tunnel portion 31 includes a tunnel cutoff portion 151 ranging from the third score line L3 to the vehicular rear edge of the tunnel portion 31, and the tunnel cutoff portion 151 is cut off when the vehicular mat 20 is folded along the third score line L3. The hole edge 421 of the through hole 42 is cut off along a cutoff line 152 when the vehicular mat 20 is folded along the third score line L3.

The invention claimed is:

1. A vehicular mat to be placed on a vehicular floor panel including a floor tunnel portion that extends in a front-rear direction of a vehicle and has a projected shape projected upward, the vehicular mat comprising:
 a floor portion configured to commonly cover at least two types of vehicular floor panels including a first vehicular floor panel and a second vehicular floor panel each having a different length in a vehicular front-rear direction;
 a tunnel portion extending in the vehicular front-rear direction and projecting upwardly to follow the floor tunnel portion, and the tunnel portion being in a middle portion of the floor portion with respect to a vehicular width direction and having an opening at a vehicular rear end thereof;

a rear edge portion that is continuous from a vehicular rear edge of the floor portion, the rear edge portion having a through hole having a shape following that of the opening of the tunnel portion;

at least two score lines including a first score line and a second score line on the floor portion extending in the vehicular width direction, the at least two score lines along one of which the vehicular mat is folded so that the rear edge portion is angled and lifted upward with respect to the floor portion; and a tunnel cutoff portion included in the tunnel portion ranging from the second score line to the vehicular rear end of the tunnel portion, the tunnel cutoff portion being to be cut off from the vehicular mat to be placed on the second vehicular floor panel, wherein the floor portion has a first length in the vehicular front-rear direction that is from a vehicular front edge of the floor portion to the first score line and the first length matches a length of the first vehicular floor panel, and the floor portion has a second length in the vehicular front-rear direction that is from the vehicular front edge of the floor portion to the second score line and the second length matches a length of the second vehicular floor panel, and the through hole is to be fitted to the opening from a vehicular rear side when the vehicular mat is folded along one of the at least two score lines and the rear edge portion is angled with respect to the floor portion.

2. The vehicular mat according to claim 1, wherein the first length is greater than the second length.

3. The vehicular mat according to claim 1, wherein the second score line is on the vehicular rear end of the tunnel portion.

4. The vehicular mat according to claim 1, further comprising:

a rear edge cutoff line in a rear portion of the rear edge portion; and a rear edge cutoff portion defined by the rear edge cutoff line and the vehicular rear edge of the rear edge portion, the rear edge cutoff portion being to be cut off from the vehicular mat to be placed on the second vehicular floor panel.

5. The vehicular mat according to claim 4, wherein the rear edge cut off portion has a width from the rear edge cutoff line to the vehicular rear edge of the rear edge portion, and the width is equal to a distance between the first score line and the second score line.

6. The vehicular mat according to claim 1, further comprising:

side wall portions extending from side edges of the floor portion and elongated in the vehicular front-rear direction to sandwich the tunnel portion therebetween; and side wall cutoff portions at vehicular rear ends of the side wall portions, the side wall cutoff portions being to be cut off from the vehicular mat to be placed on the second vehicular floor panel.

7. The vehicular mat according to claim 1, further comprising:

a through hole cutoff line around the through hole;

a through hole cutoff portion defined by the through hole cutoff line and an opening edge of the through hole, the through hole cutoff portion being to be cut off from the vehicular mat to be placed on a first vehicular floor panel.

8. A method of molding a vehicular mat into at least two types of vehicular mats for different types of vehicular floor panels, the method comprising:

preparing a common vehicular mat that is commonly used for the different types of vehicular floor panels, the common vehicular mat including a tunnel portion, a first cutoff portion, a second cutoff portion, a first score line, and a second score line, the first score line and the second score line extending in a vehicular width direction;

in molding the common vehicular mat into a first vehicular mat that is one of the at least two types of vehicular mats, carrying out a first mat molding process;

the first vehicular mat molding process including:

cutting off the first cutoff portion from the common vehicular mat, the first cutoff portion is a part of a rear edge portion of the common vehicular mat;

according to the cutting off of the first cutoff portion, forming a first through hole in the rear edge portion to have a shape corresponding to a shape of an opening of the tunnel portion opening toward a vehicular rear side;

according to the forming of the first through hole, obtaining a first rear edge portion having the first through hole;

after the forming of the first through hole, obtaining the first vehicular mat used for a large floor panel;

folding the first vehicular mat along the first score line so that the first rear edge portion is lifted upward as a first wall portion and the first through hole is fitted to the opening of the tunnel portion from the vehicular rear side; and according to the folding of the first vehicular mat along the first score line, obtaining the first vehicular mat that is molded into a shape corresponding to the large floor panel;

in molding the common vehicular mat into a second vehicular mat that is another one of the at least two types of vehicular mats, carrying out a second mat molding process;

the second vehicular mat molding process including:

cutting off the second cutoff portion from the common vehicular mat, the second cutoff portion being a rear end portion of the tunnel portion and ranging from the second score line to a vehicular rear end of the tunnel portion;

according to the cutting off of the second cutoff portion, obtaining a second rear edge portion ranging from the second score line to a vehicular rear edge of the common vehicular mat and obtaining the second vehicular mat including the second rear edge portion and used for a small floor panel;

after the cutting off of the second cutoff portion, folding the second vehicular mat along the second score line that is on a vehicular front side with respect to the first score line, folding the second vehicular mat along the second score line so that the second rear edge portion is lifted upward as a second wall portion; and according to the folding of the second vehicular mat along the second score line, obtaining the second vehicular mat that is molded into a shape corresponding to the small floor panel.

9. The method according to claim 8, wherein the cutting off of the first cutoff portion includes cutting off a part of a hole edge around a through hole that is included in the rear edge portion of the common vehicular mat.

10. The method according to claim 8, wherein the second vehicular mat molding process further includes:

cutting off a third cutoff portion from the common vehicular mat, the third cutoff portion being a rear portion of the rear edge portion, the rear portion having a width that is equal to a distance between the first score line and the second score line and elongated in the vehicular width direction.

11. The method according to claim 8, wherein the second vehicular mat molding process further includes:

cutting off fourth cutoff portions from the common vehicular mat, the fourth cutoff portions being rear end portions of side wall portions of the common vehicular mat, the side wall portions extending in the vehicular front-rear direction and sandwiching the tunnel portion therebetween.

* * * * *